Feb. 26, 1957 W. S. HENKELMAN 2,782,990
MOTOR VEHICLE COUNTERS
Filed June 15, 1955
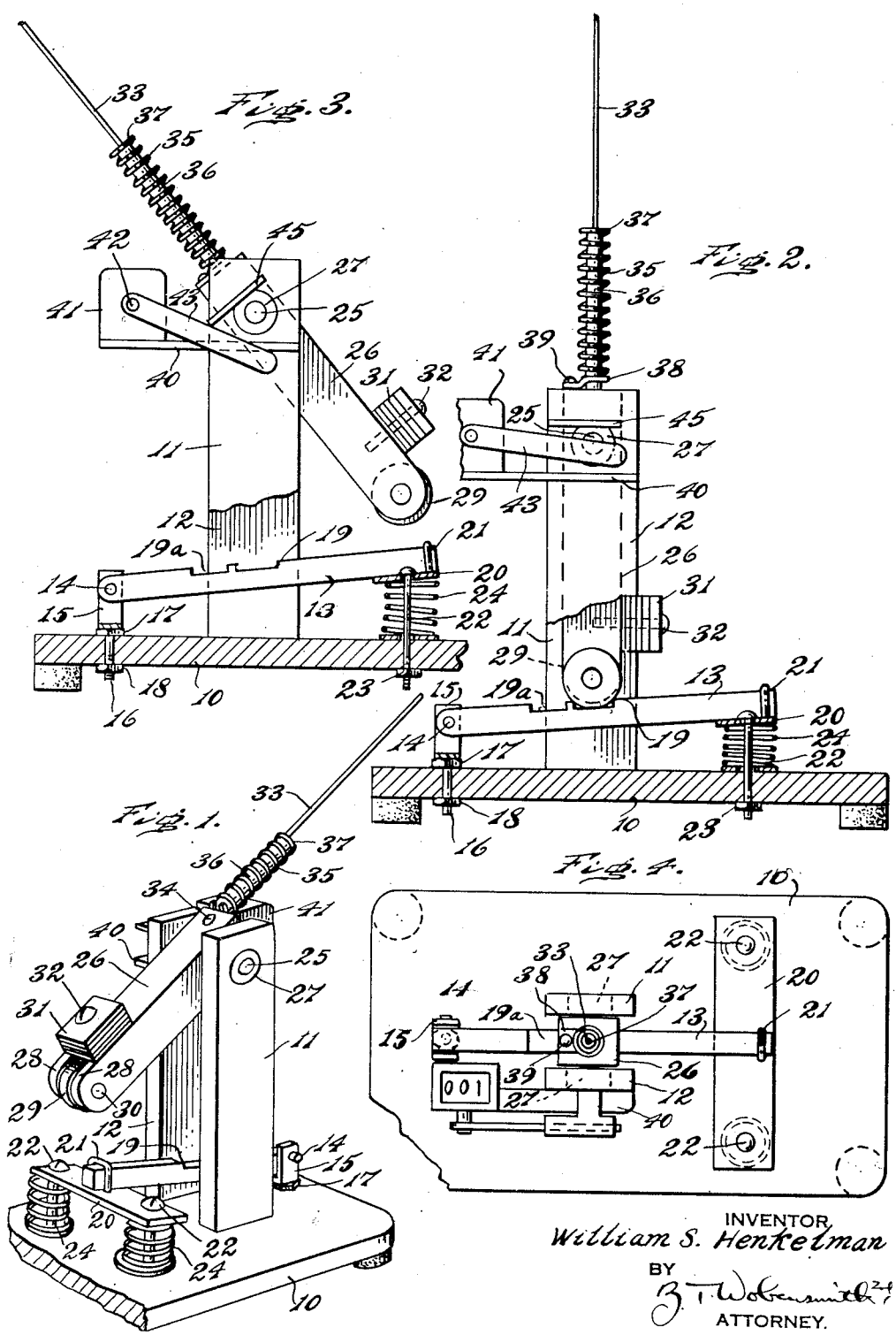
INVENTOR,
William S. Henkelman
BY
B. T. Wolvensmith
ATTORNEY.

United States Patent Office 2,782,990
Patented Feb. 26, 1957

2,782,990

MOTOR VEHICLE COUNTERS

William S. Henkelman, Egg Harbor City, N. J.

Application June 15, 1955, Serial No. 515,634

7 Claims. (Cl. 235—99)

This invention relates to the motor vehicle counters and more particularly to a structure which may be employed in a roadway, at the entrance to a parking lot, or the like, for counting the number of vehicles passing thereover.

Various devices have heretofore been proposed for this purpose but considerable difficulty has been encountered in operation because of failures occurring for various reasons.

It is the principal object of the present invention to provide a counter for motor vehicles or the like which is simple and sturdy in construction, and reliable in its operation.

It is a further object of the present invention to provide a counter for motor vehicles and the like which may be adjusted for changing conditions of operation.

It is a further object of the present invention to provide a counter for motor vehicles and the like which will be rapid in its action while, at the same time, objectionable overtravel is minimized.

It is a further object of the present invention to provide a counter for motor vehicles and the like which while rugged will have adequate sensitivity for counting purposes and will not be likely to permit false recordings.

Other objects and advantageous features of the invention will be apparent from the specification and claims.

The nature and characteristic features of the invention will be more readily understood from the following description, taken in connection with the accompanying drawings forming part thereof, in which:

Figure 1 is a perspective view of the counter of the present invention removed from its cover;

Fig. 2 is a side elevational view of the counter in accordance with the present invention, parts being broken away to show the details of construction;

Fig. 3 is a view similar to Fig. 2, but showing the counter in another position, and Fig. 4 is a top plan view of the counter.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the counter mechanism is shown with the protective and enclosing cover or case removed as the same forms no part of the novel features of the present invention.

The counter in accordance with the invention preferably includes a base plate 10 having a pair of spaced uprights 11 and 12 secured thereto. The base plate 10 has mounted thereon a latch lever 13. The fulcrum of the latch lever 13 is preferably adjustable in relation to the base plate 10 and for this purpose the fulcrum pin 14 on which the lever 13 is carried may be mounted in a support 15 from which a threaded stud 16 extends through the base plate 10. An upper adjusting nut 17 and a lower adjusting nut 18 carried on the stud 16 and engaging the plate 10 may be employed to determine the level of the fulcrum pin 14.

The latch lever 13, intermediate its ends is preferably provided with a plurality of latching notches 19 and 19a for purposes to be explained. At the opposite end of the latch lever 13, a spring abutment bar 20 is provided having a U-shaped clamp 21 which engages the latch lever 13. The bar 20 has a pair of limit pins 22 extending downwardly therefrom and through the base plate 10 with nuts 23 on the lower ends to limit the upward movement of the bar 20 and of the latch lever 13. Compression springs 24 are interposed between the bar 20 and the base 10 for urging the bar 20 and the latch lever 13 to their upwardly disposed positions.

The uprights 11 and 12 at the upper portions thereof have a shaft 25 mounted therein on which the latching arm 26 is mounted. Ball bearings 27 for the shaft 25 are preferably provided in the uprights 11 and 12. The lower end of the arm 26 has spaced end walls 28 between which a roller bearing 29 is mounted on a shaft 30. The space between the end walls 28 is preferably in excess of the width of the latch lever 13 and the bearing 29 is adapted to be engaged in the notch 19 or 19a, or moved out of the notch 19 or 19a, as hereinafter explained.

The lower end of the latching arm 26 is is provided with a plurality of weights 31 of lead or the like, mounted on a bolt 32. The weights 31 may be changed as desired to adjust the speed of operation.

Aligned with the latching arm 26, and extending therefrom, a flexible actuating rod 33 is provided which may be of steel, glass, plastic, or the like. The rod 33 may be secured in place by a set screw 34 and sheathed and stiffened, contiguous to the latching arm 26, by a coil spring 35. A flexible sleeve 36 of rubber or the like may be interposed. The spring 35 has a collar 37 at its outer end and at its inner end is held from displacement by a forked clip 38 which is in turn held on the end of the arm 26 by a bolt 39.

On the outer side of the upright 12, a mounting bracket 40 is provided on which a number indicating register 41 is supported. The register 41 has an internal return spring (not shown) and has a shaft 42 on which a lever 43 is clamped.

The shaft 25 has secured thereto a lever 45 which is adapted to move therewith and by engagement with the lever 43 and movement for approximately but less than a quarter turn of the shaft 25 to add one to the count shown on the register 41.

The mode of operation should be apparent from the foregoing but will be summarized briefly.

The counter base plate 10 and the other structure thereon including the protective cover, is mounted beneath the surface of the roadway and with the rod 33 projecting vertically above the ground surface. The bearing 29 will be engaged in the notch 19 or in the notch 19a. When the bumper or other part of the vehicle strikes the rod 33 and tends to bend it down towards the ground, the latching arm 26 is also moved to disengage the bearing 29 from the notch 19 or the notch 19a, by downward movement of the latch lever 13 against the force of the springs 24.

The bearing 29 at the lower end of the latching arm 26 is thus freed from its engagement with the latch lever 13. As the shaft 25 is turned, movement of the lever 45 is effective on the lever 43 to actuate the register 41 to show an added number.

When the rod 33 is released, by the passage therebeyond of the motor vehicle, the weights 31 are effective to swing the arm 26 rapidly downwardly, against the force of the springs 24 to move the bearing 29 into latching engagement in either the notch 19 or the notch 19a, depending upon the speed of return. The counter is then ready for a subsequent registering movement.

Whipping action upon the return of the arm 33 to its upright position is minimized not only by the use of a double notch 19, 19a, but also by the fulcrum height adjustment for the fulcrum pin 14 and also by the adjustment of upward movement of the latch lever 13 and the spring force of the springs 24.

I claim:

1. Motor vehicle counting apparatus comprising a base, a lever pivotally mounted on said base, said lever having an upwardly extending light and flexible rod portion for engagement by the vehicle to be counted and a latch portion, a latch lever carried by said base and having a portion for latching engagement by said first mentioned lever, means for normally urging said latch lever into engaging position, and count registering means actuated by said first mentioned lever.

2. Motor vehicle counting apparatus as defined in claim 1 in which said rod portion has an additional supporting member at its place of connection with said latch portion.

3. Motor vehicle counting apparatus comprising a base, a lever pivotally mounted on said base, said lever having an upwardly extending light and flexible rod portion for engagement by the vehicle to be counted and a downwardly extending latch portion, a latch lever carried by said base and having a portion for latching engagement by said first mentioned lever, resilient means for normally urging said latch lever into engaging position, and count registering means actuated by said first mentioned lever.

4. Motor vehicle counting apparatus comprising a base, uprights carried by said base, a lever pivotally mounted on said uprights, said lever having an upwardly extending light and flexible rod portion for engagement by the vehicle to be counted and a downwardly extending latch portion, a latch lever carried by said base, said latch lever extending between said uprights and having a notched portion for latching engagement by said first mentioned lever, resilient means for normally urging said latch lever into engaging position, and count registering means actuated by said first mentioned lever.

5. Motor vehicle counting apparatus comprising a base, a supporting member carried by said base, a lever pivotally mounted on said supporting member, said lever having an upwardly extending light and flexible rod portion for engagement by the vehicle to be counted and a latch portion, a latch lever carried by said base and having a portion for latching engagement by said first mentioned lever, resilient means for normally urging said latch lever into engaging position, count registering means carried by said supporting member, and actuating members interposed between said first mentioned lever and said last means.

6. Motor vehicle counting apparatus comprising a base, a first lever pivotally mounted on said base, said first lever having an upwardly extending light and flexible rod portion for engagement by the vehicle to be counted and a latch portion, a latch lever carried by said base and having a portion for latching engagement by said first mentioned lever, means for normally urging said latch lever into engaging position, an adjustable fulcrum for said latch lever, and count registering means carried by said base and actuated by said first mentioned lever.

7. Motor vehicle counting apparatus comprising a base, a first lever pivotally mounted on said base, said first lever having an upwardly extending light and flexible rod portion for engagement by the vehicle to be counted and a latch portion, a latch lever carried by said base and having a portion for latching engagement by said first mentioned lever, resilient means for normally urging said latch lever into engaging position, members for adjusting said resilient means, and count registering means actuated by said first mentioned lever.

References Cited in the file of this patent

FOREIGN PATENTS

| 122,884 | Great Britain | Feb. 4, 1919 |
| 343,733 | France | Aug. 13, 1904 |